United States Patent [19]
Nozu

[11] Patent Number: 5,588,293
[45] Date of Patent: Dec. 31, 1996

[54] FLUID ENERGY CONVERSION APPARATUS

[76] Inventor: Rikurou Nozu, 13-1, Chishirodai Higashi 4-chome, Wakaba-ku, Chiba-shi Chiba, Japan

[21] Appl. No.: 81,288

[22] PCT Filed: Oct. 21, 1992

[86] PCT No.: PCT/JP92/01365

§ 371 Date: Jun. 18, 1993

§ 102(e) Date: Jun. 18, 1993

[87] PCT Pub. No.: WO93/08375

PCT Pub. Date: Apr. 29, 1993

[30] Foreign Application Priority Data

Oct. 21, 1991 [JP] Japan .................................. 3-336386

[51] Int. Cl.⁶ ............................................. F16D 31/02
[52] U.S. Cl. ............................................. 60/398; 415/3.1
[58] Field of Search .................................. 60/398; 415/3.1

[56] References Cited

U.S. PATENT DOCUMENTS

| | | |
|---|---|---|
| 3,643,675 | 2/1972 | Wetterstad . |
| 4,271,668 | 6/1981 | McCormick . |
| 4,286,347 | 9/1981 | Modisette .................... 60/398 |
| 4,385,492 | 5/1983 | Lee ............................. 60/398 |
| 4,629,904 | 12/1986 | Rojo, Jr. et al. ............ 60/398 |

FOREIGN PATENT DOCUMENTS

| | | |
|---|---|---|
| 1398408 | 3/1965 | France . |
| 1198145 | 8/1965 | Germany . |
| 1919310 | 10/1969 | Germany . |
| 660770 | 6/1987 | Germany . |
| 2-64270 | 5/1990 | Japan . |
| 934141 | 8/1963 | United Kingdom . |
| 2100810 | 1/1983 | United Kingdom . |
| 2216999 | 10/1989 | United Kingdom . |

*Primary Examiner*—John T. Kwon
*Attorney, Agent, or Firm*—Stroock & Stroock & Lavan

[57] ABSTRACT

A fluid energy conversion apparatus including a fluid path assembly having an outside guide assembly, a cylindrical wall inside surface and at least one inside guide assembly is provided. There is also a cylindrical partition wall which extends between the outside guide assembly and the inside guide assembly with its central axis set on the central axis of the cylindrical wall inside surface, the cylindrical wall inside surface of the outside guide assembly and the cylindrical partition wall defining an annular outside path therebetween and the outside peripheral surface of the inside guide assembly and the cylindrical partition wall defining an annular inside path therebetween. There is a plurality of support struts connecting the outside guide assembly, the inside guide assembly and the cylindrical partition wall. Also included is a first rotary member that include an annular hub located adjacent a first end portion of the inside guide assembly and a second rotary member having a second annular hub located adjacent a second end portion of said inside guide assembly. Also included are stator blades, a fluid pressurizing-accelerating device and exhaust nozzles formed in both sides of each of the first turbine rotor blades in a position adjacent to a trailing edge of each of the first turbine rotor blades.

6 Claims, 9 Drawing Sheets

FLUID ENERGY CONVERSION APPARATUS

FIELD OF THE INVENTION

The present invention relates to an, apparatus for converting a fluid energy into a mechanical energy, and more particularly, to an apparatus for converting an air energy into a mechanical revolution energy.

BACKGROUND OF THE INVENTION

An oscillating water column power generating apparatus (OWC) is designed for use in converting a waver energy into an air energy, and then for converting, by an air turbine, this air energy into a rotational energy of a turbine shaft.

Generally speaking, in the OWC, a box-type member consisting of a boundary side walls and a crown deck is installed at sea in such a condition that the foot of the boundary side walls is in normal soak in sea water; the crown deck of the box-type member is formed an air vent to form a guide path for guiding the air passing through the air vent. Disposed in the guide path is the air turbine. A generator is couped to the output shaft of the air turbine for driving thereof.

In the OWC, with the rise of a free water surface in a chamber formed in the box-type member, air in the chamber is pushed upward, there occurs an air stream flowing towards the guide path from the inside of the chamber; reversely with the descent of the free water surface In the chamber, there takes place an air stream in the guide path, flowing towards the chamber from the guide path. That is, the wave energy is turned into the air energy. The air turbine is turned by the air stream flowing through inside the guide path, converting the air energy of the air stream into the rotational energy of the air turbine output shaft. When a generator is driven by the output shaft of the air turbine, the rotational energy of the air turbine is converted into the: electric energy.

In the above-described OWC, the direction of the air stream flowing in the guide path is reversed alternately. In this case, it should be noted that the modulus of energy conversion will lower if the output shaft of the air turbine is not rotated in the same direction at all times by the air stream reversed altematively in the direction of its flow.

A Wales turbine is known as this type of air turbine whose output shaft is kept on constantly rotating in one direction albeit the alternate reversion of the direction of flow of the air stream. In this Wales turbine, the central axis of the cylindrical wall inside surface is an axis of rotation, on which a rotary member of a spindle shape tapered at its both ends in the axial direction is supported freely rotatably within the guide path having the cylindrical wall inside surface, and also having a symmetrical blade section known as for example NACA0021 in the maximum diameter section of the rotary member; four turbine rotor blades are provided protrusively in a radial direction, in increment of 90 degrees of angle, with the chord line of the symmetrical blade section arranged in normal plane on the rotational axis.

The turbine rotor blades having the symmetrical blade section are designed to have an attack angle proportional to the speed of the air stream at a roundish leading edge section of the symmetrical blade section. Therefore, there takes place a lift force on the turbine rotor blades, the tangential component of the lift force rotates the rotary member of spindle shape. Since the turbine rotor blades have the chord line of the symmetrical blade section within a normal plane with rotational axis even when the direction of the air stream in the guide path is reversed, the direction of the rotational of the rotary member of spindle shape will not change.

In the Wales turbine, the maximum thickness part in the section of the turbine rotor blades is present in a position close to the leading edge of the blade; when a symmetrical blade section having a great blade thickness ratio (a ratio of the maximum blade thickness to a chord length), the turbine rotor blades can start of itself. In this case, however, the tangential component of the lift force arising on the turbine rotor blades decreases at a relatively low fluid speed, and at the same time a drag component increases, resulting in the ceiling revolution of the turbine and in a poor energy conversion modulus. On the other hand, with the maximum thickness part shifted to the trailing edge side and with the symmetrical blade section of a decreased maximum thickness ratio used, a high speed revolution of the turbine can be obtained at a high fluid speed, and a high modulus of energy conversion is obtained. In this case, a deteriorated starting property occurs, resulting in a failure in achieving self-starting at a low fluid speed.

DESCRIPTION OF THE INVENTION

It is an object of the present invention to provide an energy conversion apparatus having the above-described Wales turbine improved for the efficient conversion of the fluid stream energy into the mechanical energy of the turbine output shaft and for the improvement of the self-starting property.

Generally speaking, in the present invention an annular fluid stream is formed to rotate the turbine rotor blades of the Wales turbine in the fluid path assembly for forming the fluid stream, and also another annular fluid stream is formed at the outside in the direction of radius of the annular fluid stream stated above, for rotating turbine rotor blades of preferably a Babintiev's impulse turbine or a McCormick impulse turbine by this outside fluid stream, a pressurized and accelerated fluid generated by the output of these turbines is blown off outside each of the blades of the Wales turbine through a path formed in the blade thereof and bent to the trailing edge side thereof, thereby improving the self-starting property of the Wales turbine and furthermore enhancing the modulus of energy conversion by controlling, by a fluid control device, the direction of the vectored fluid flow blown off to the outside of blades of the Wales turbine.

The fluid energy conversion apparatus in accordance with the present invention is provided, as a member for forming a fluid path, with an outside guide assembly having a primary part of the inside wall surface as a cylindrical wall inside surface, at least one inside guide assembly provided in the inside of the outside guide assembly and having an outer peripheral surface formed in a shape of rotation symmetry at the axis of symmetry in the central axis of the cylindrical wall inside surface of said outside guide assembly, a cylindrical partition wall which has a central axis in alignment with the central axis of the cylindrical wall inside surface, and extends between the outside guide assembly and the inside guide assembly to subdivide a path between the cylindrical wall inside surface of the outside guide assembly and the outer peripheral surface of the inside guide assembly into two annular fluid paths including an outside path and an inside path, and the fluid path assembly including a plurality of support struts of such a shape of the least fluid resistance which connect the outside guide assembly, the partition wall and the inside guide assembly. This fluid path assembly concentrically sustains two fluid paths including the above-mentioned annular inside path and annular outside path located at the outside of the annular inside path in a direction of radius.

On the fluid path assembly is rotatably supported a first rotor shaft having its rotational axis coaxially with the central axis of the cylindrical wall inside surface of the outside guide assembly. On the first rotor shaft is mounted a first rotary member, which is positioned on one end in the axial direction of the inside guide assembly. The first rotary member has an annular huh secured on the first rotor shaft and a plurality of a first turbine rotor blades fixed at this annular huh and radially protruding out into the inside path formed between the outer peripheral surface of the inside guide assembly and the partition wall.

Each of the first turbine rotor blades has a symmetrical blade section having a chord line within a plane normal to the rotational axis of the first rotor shaft, and is equivalent to each of the turbine rotor blades of the Wales turbine. The first turbine rotor blades convert the fluid energy of the fluid flowing in parallel with the the first rotor shaft in the inside path into the rotational energy and output to the first rotor shaft.

A second rotor shaft is coaxially and mutually rotatably mounted on the first rotor shaft in the fluid path assembly. A second rotary member is rotatably mounted on the second rotor shaft and is positioned on the axial other end of the inside guide assembly. The second rotary member is coaxially and rotatably supported on the second rotor shaft, and has a disc hub which is coaxially and rotatably supported on the second rotor shaft and drivingly coupled thereto through an overdrive gearing, a ring member which has substantially the same radius as that of the partition wall and is supported coaxially with the second rotor shaft by means of a plurality of supporting struts of the least fluid resistance protruding into the annular inside path, and a number of second turbine rotor blades respectively fixed on the outer circular surface of the ring member and protruding into the outside path formed between the cylindrical wall inside surface of the outside guide assembly and the partition wall.

On the cylindrical wall inside surface of the outside guide assembly, a plurality of sets of stator blades are fixed at one end thereof to the cylindrical wall inside surface and radially protruding into the outside path. Each set includes two stator blades locating at both sides adjacent to the each of the second turbine rotor blade, and a plurality sets of stator blades are arranged at equal intervals in a tangential direction. The section of each blade of the one set of stator blades is inclined at a staggered angle in relation to a plane normal to the rotational central axis of the second rotary member with the chord lines thereof crossing with each other at a point outside of the stator blades so that the second turbine rotor blades can rotate the rotary member only in one direction of rotation. That is, the second rotary member, having a number of turbine rotor blades on the radially outside of the first turbine rotor blades, is easier to start than the first turbine rotor blades, accordingly, the second turbine blades begins to self-start for rotating the second rotor shaft through the overdrive gearing at a low fluid speed at which the first turbine rotor blades are hard to self-start for driving the first rotor shaft.

Inside of the inside guide assembly is mounted a fluid pressurizing-accelerating apparatus which includes a casing means fixed on the inside guide assembly and having a discharge port directed towards the hub of the first rotary member and a rotary means which is fixed on the second rotor shaft to rotate together with the second rotor shaft. The rotary means of the fluid pressurizing-accelerating device is rotated by the overdrive gearing at an increased rotational speed together with the second rotor shaft than the rotational speed of a ring member on which the second turbine rotor blades are projectingly provided; therefore, immediately after the second rotary member starts rotating, a fluid with increased pressure and increased speed over the fluid flowing in the inside and outside paths is discharged out to the discharge port.

The above-mentioned hub of the first rotary member is provided with collector ports in the circular edge portion thereof at its one side for receiving the fluid discharged from the discharge port of the fluid pressurizing-accelerating device and also is provided, in the inside of each of the first turbine rotor blades and within a plane vertical to the first rotor shaft, with a fluid exhaust path having curved portion communicating with the collector ports in the aforesaid hub at one end and with a exhaust nozzle open on both side faces of the blades at a space adjacent to the trailing edge of the first turbine rotor blades at the other end. Therefore, the fluid pressurized and accelerated by the fluid pressurizing-accelerating device mentioned above is turned round when passing through the curved portion of the fluid exhaust path during discharge out into the inside path from the receiving of the fluid into the fluid exhaust path through the collector port formed in the hub of the first rotary member, thereby enabling, as its reaction, the starting of the first rotary member even when the fluid speed is low in the inside and outside paths formed in the fluid path assembly.

Furthermore, in the present invention, each of the first turbine rotor blades are provided with a fluid control device having a fluid inlet scoop opening on the chord line of the leading edge, a pair of control fluid inlets opening in symmetrical positions in relation to the chord line in both side surfaces of the blade in the vicinity of the leading edge, a fluid control chamber communicating with the fluid inlet scoop and the control fluid inlets, and a pair of control paths opening at one end in the fluid control chamber in a symmetrically off position in relation to the chord line and also opening at the other end in a symmetrical position in relation to the chord line in the inside wall of the fluid exhaust path; and the exhaust nozzle opened on the first turbine rotor blade is a rectilineal opening formed in parallel with the trailing edge of the turbine rotor blades. The fluid stream led into the fluid control chamber through the fluid inlet scoop which opens at the leading edge of the first turbine rotor blades is adhered to the low pressure side by a difference of static pressure acting on both side surfaces of the first turbine rotor blades, and flows in either one of the control fluid paths, and supplied into the fluid exhaust path through an opening formed in the inside wall of the fluid exhaust path as a control fluid. Therefore by the control fluid supplied from said one of the control path, the fluid discharged from the fluid pressurizing-accelerating device into the fluid exhaust path is blown off as a vectored plane flow from the exhaust nozzle formed in the vicinity of the trailing edge of the high-pressure side surface of the first turbine rotor blades and opened rectilineally in parallel with the trailing edge, thereby increasing the lift coefficient of the first turbine rotor blades and also increasing a lift-drag ratio to improve the modulus of conversion of output energy to the first output shaft on which the first turbine rotor blades are fixed.

Furthermore, in the present invention, a second inside guide assembly of the same shape as the aforementioned inside guide assembly is located in the fluid path assembly, on the other side in the axial direction of the first rotary member, and is fixed coaxially with the cylindrical wall inside surface of the fluid path assembly with one end thereof positioned on the other side surface of the hub of the first rotary member; a third rotor shaft located in line with the second rotor shaft on the axial other side of the first rotary member is arranged coaxially with the first rotor shaft within the fluid path assembly; and a third rotary member is installed in symmetry with the first rotary member in relation to a plane normal to the central axis of the first rotor shaft. Therefore, when the fluid flowing in the fluid path in the fluid path assembly has reversed to an axial direction, the first rotary member can be kept rotating efficiently in the same direction by means of the third rotary member.

BEST MODE FOR EMBODYING THE INVENTION

Figure 10:
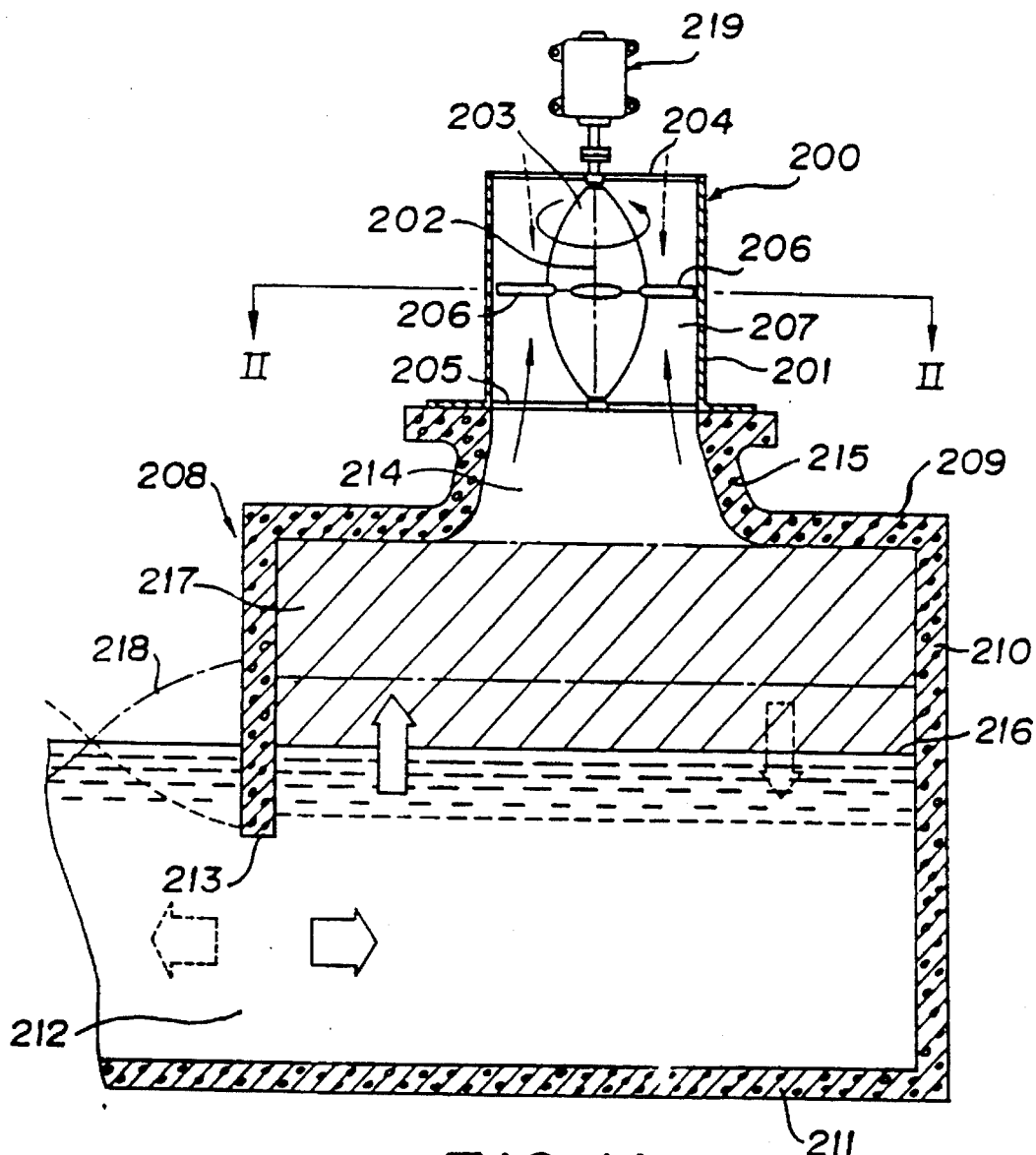
FIG. 10 is a side view typically showing a basic constitution of the oscillating water column power generating apparatus using the Wales turbine.
Figure 11:
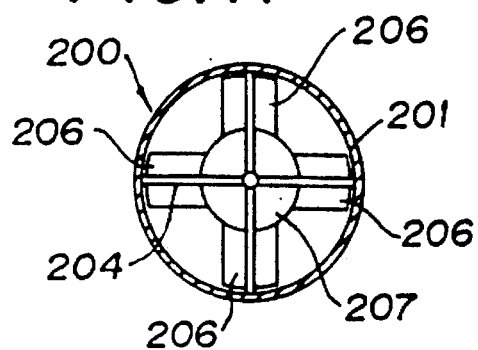
FIG. 11 is a front view of the Wales turbine.

Prior to explaining a preferred embodiment of the present invention, the basic constitution of an oscillating water column power generating apparatus which is most suitable for application of a fluid energy conversion apparatus in accordance with the present invention will be typically described by referring to FIGS. 10 and 11.

In the drawings, the reference numeral 200 denotes a Wales turbine, in which a turbine shaft 203 in a form of spindle shape having a rotational central axis 202 on the central axis of a cylindrical guide assembly 201 is rotatably supported with support struts 204 and 205. On the turbine shaft 203 are protrusively installed four turbine rotor blades 206 of symmetrical blade section having a chord line within a plane normal to the rotational central axis 202. The turbine rotor blades 206 are located in an air path 207 formed between the guide assembly 201 and the turbine shaft 203.

A reference numeral 208 refers to a box-type member made of concrete and having a crown deck 209, boundary side walls 210 and a bottom deck 211. On the side walls 210 and between the side wall 210 and the bottom deck 211, there are provided with one or two openings 212. The member 208 is installed at the depth where the opening 212 of the walls 210 is normally immersed in water regardless of wave height, and a lower edge 213 of the walls 210 at the upper edge of the opening 212 is soaked in water, and fixed on the sea bottom with the bottom deck 211. The crown deck 209 is formed with an air vent 214 and a cylindrical installation seat 215 enclosing the air vent 214 integrally with the deck 209. On the top of the installation seat 215 the guide assembly 201 is fixed with its lower end.

A free water surface 216 in the member 208 is high above the lower edge 213 of the side wall 210: an air chamber 217 is formed above the free water surface 216. As the height of the surrounding wave 218 changes, the free water surface 218 in the member 208 varies as indicated with many wave level lines in FIG. 11. With this change, the volumetric displacement of the air chamber 217 takes place in the air path 207 formed between the guide assembly 201 and the turbine shaft 203, forming an air stream which reciprocates in a longitudinal direction of the rotational central axis 202 of the turbine shaft 203. The turbine rotor blade 206 of the Wales turbine 200 has a chord line in a plane normal to the rotational central axis 202 of the turbine shaft 203, and also has a symmetrical blade section on this chord line as an axis of symmetry, thereby rotating the turbine shaft 203 in one direction of rotation by the air stream reciprocating in the air vent 207. Then the energy of this air stream is converted into the rotational energy of the turbine shaft 203. When a generator 219 is driven to rotate through the turbine shaft 203, the rotational energy of the turbine shaft 203 is coverted into an electric energy.

Figure 1:
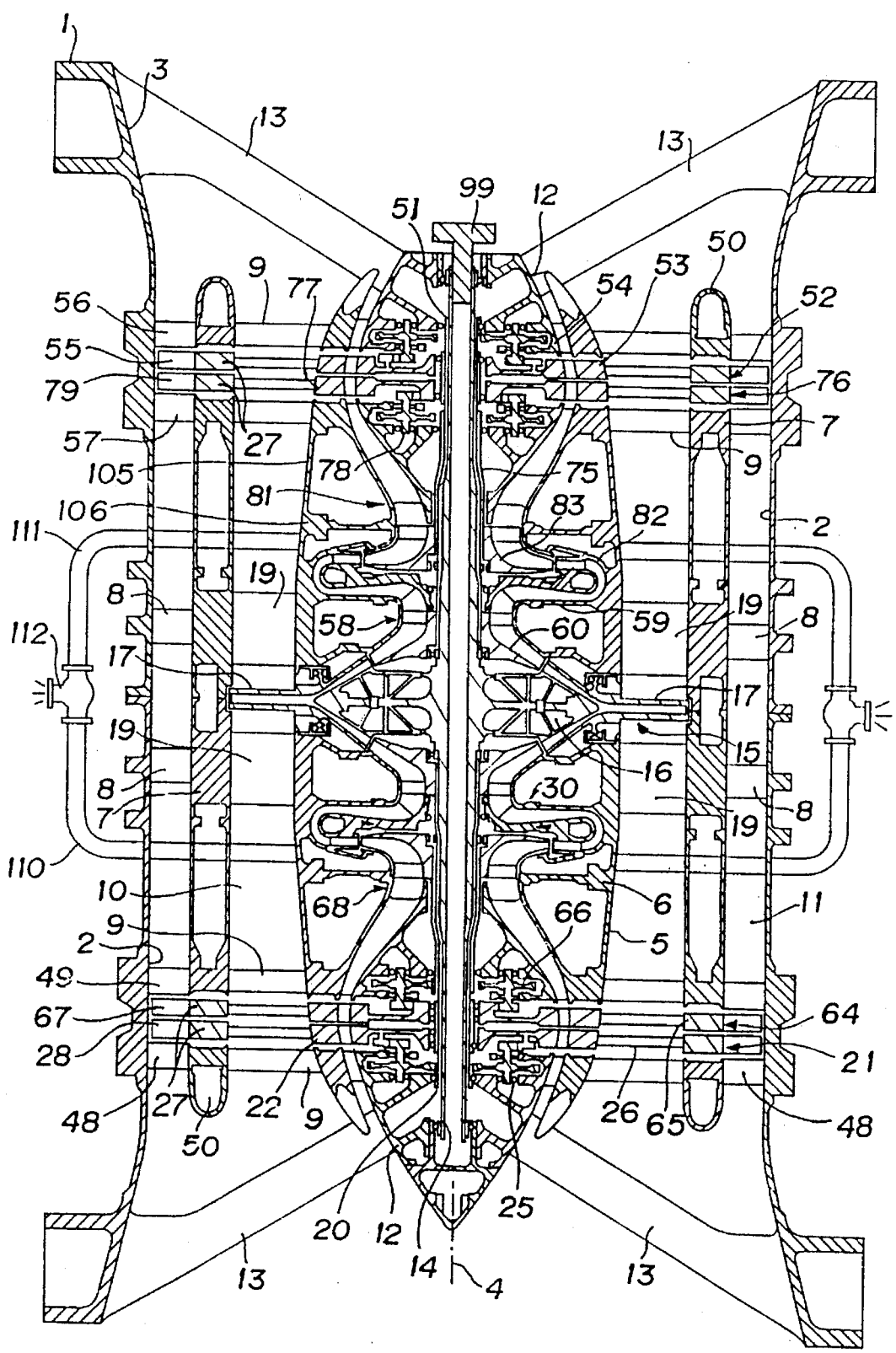
FIG. 1 is a sectional view of one embodiment of a fluid energy conversion apparatus according to the present invention.
Figure 2:
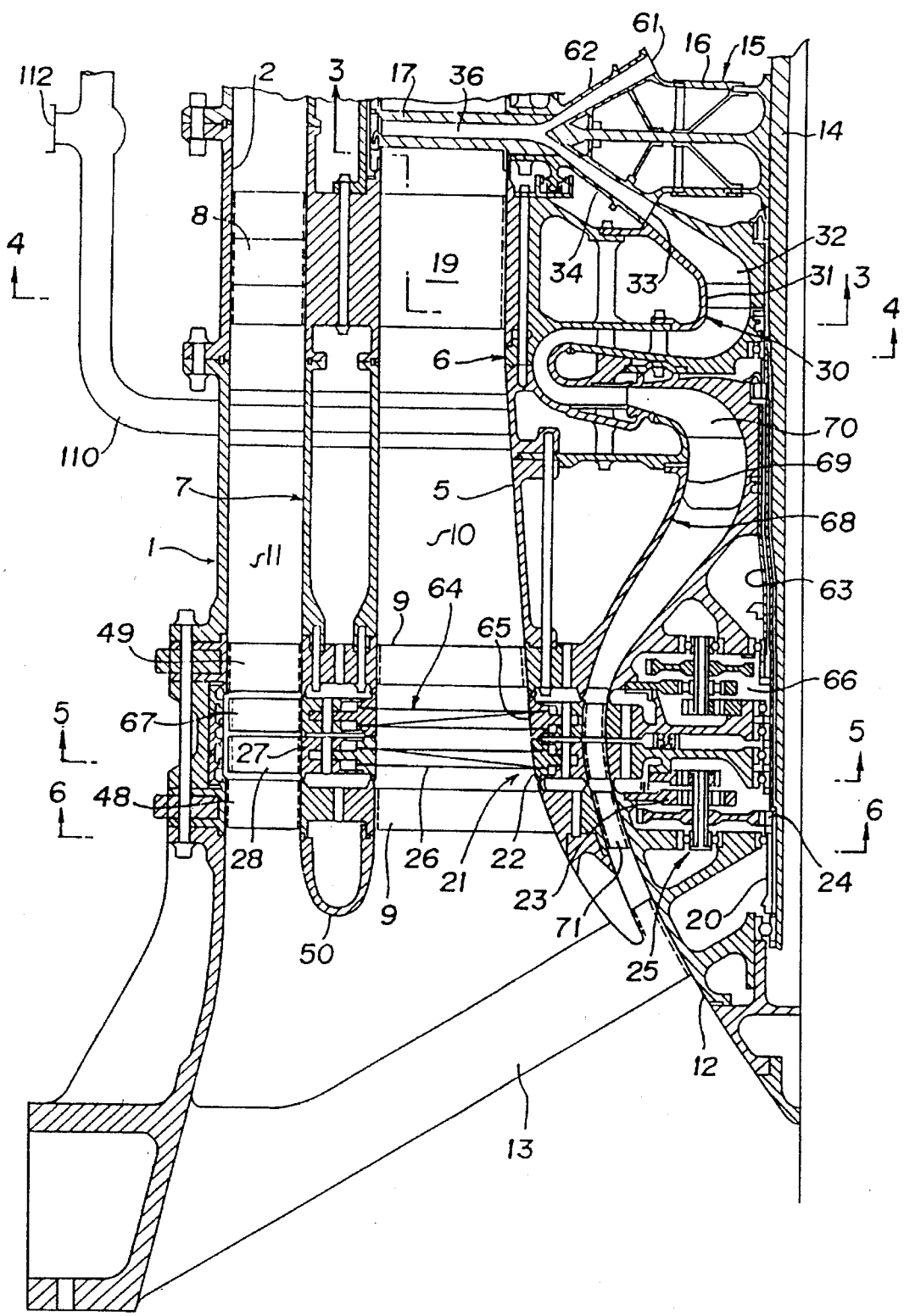
FIG. 2 is an enlarged sectional view of a principal part thereof.

FIG. 1 is a sectional view showing one preferred embodiment of the air energy conversion apparatus in accordance with the present invention which is to be used in the OWC. In FIGS. 2 to 8 are partly shown details of the embodiment.

In these drawings, a reference numeral 1 refers to an outside guide assembly. The outside guide assembly 1 has a cylindrical wall inside surface 2 as a principal portion; and both axial end portions of the cylindrical wall inside surface 2 are formed as conical walls 3 with their diameter expanded towards the end, and are connected by a smooth curvature with the cylindrical wall inside surface 2. In this outside guide assembly 1, first and second inside guide assemblies 6 and 106 of the same size having outer peripheral surfaces 5 and 105 respectively which are formed in a symmetrical shape of revolution on an central axis 4 of the cylindrical wall inside surface 2 as a symmetrical axis are supported on the outside guide assembly 1, forming an annular fluid path between the cylindrical wall inside surface 2 of the outside guide assembly 1 and the outer peripheral surfaces 5 and 105 of the inside guide assemblies 6 and 106. Next, a partition wall 7 of a cylindrical wall type having its central axis on the central axis 4 is arranged so as to be located between the cylindrical wall inside surface 2 of the outside guide assembly 1 and the outer peripheral surfaces 5 and 105 of the inside guide assemblies 6 and 106: the partition wall 7 is connected to the outside guide assembly 1 by a plurality of support struts 8; and the partition wall 7 is connected to the inside guide assemblies 6 and 106 by a number of support struts 9. Then, the partition wall 7 and the inside guide assemblies 6 and 106 are supported with the outside guide assembly 1, and the fluid path is separated by the partition wall 7 into an annular inside path 10 formed between the partition wall 7 and the outer peripheral surfaces 5 and 105 of the inside guide assemblies 6 and 106 and an annular outside path 11 formed between the partition wall 7 and the cylindrical wall inside surface 2 of the outside guide assembly 1. Each of the struts 8 and 9, being disposed inside of the outside path 11 and the inside path 10, is made in a sectional form of the least resistance to the air stream flowing in parallel with the centralaxis 4 inside of these paths 10 and 11.

A pair of supporting member 12, 12 are supported by support struts 13, 13 on the outside guide assembly 1 in positions axially apart from each other on the central axis 4 of the cylindrical wall inside surface 2 of the outside guide assembly 1. Between these supporting members 12, 12 is rotatably supported a first rotor shaft 14 on the central axis 4 as a rotational central axis thereof. On the first rotor shaft 14 is fixed a hub 16 of a first rotary member 15 between opposed ends of the inside guide assemblies 6 and 106 in relation to the axial direction. The hub 16 has a built-up construction made in a form symmetry having plane of symmetry normal to the central axis 4, and has an annular form. Along the outer peripheral edge of this hub 16 are protrusively provided first turbine rotor blades 17, which is four in number and protruded into the inside path 10.

Figure 7:
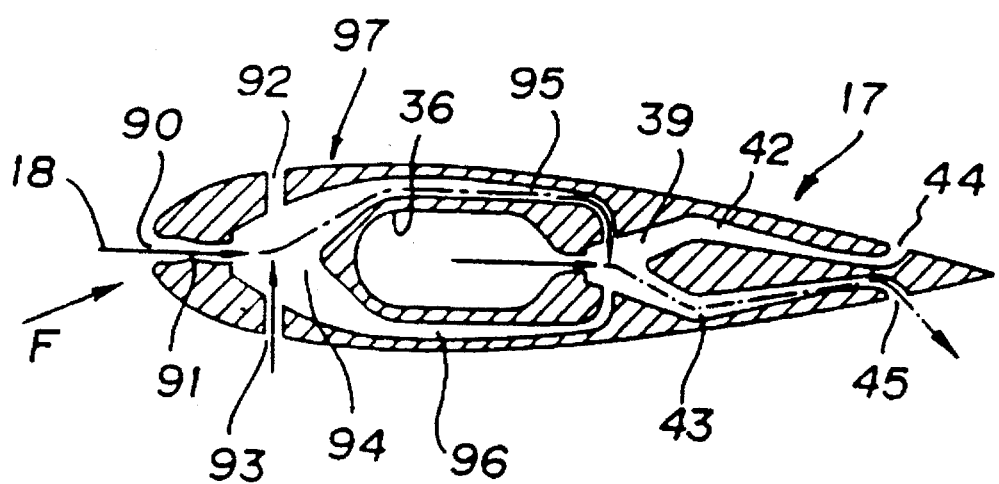
FIG. 7 is a cross sectional view of first turbine rotor blades taken along a line 7—7 of FIG. 3.

Each of the first turbine rotor blades 17, as shown in FIG. 7, is of a symmetrical airfoil blade section formed in a line symmetry distributed about the chord line 18 which is the axis of symmetry, and are fixed at the hub 16 with the chord line 18 placed within a plane normal to the central axis 4. The turbine rotor blades 17 are arranged 90 degrees apart around the outer peripheral edge of the hub 16, with respect to the center of the rotational central axis of the first rotor shaft 14, thus constituting the Wales turbine. Reference numeral 19 denotes guide vanes arranged within the inside path 10 on both sides of the first turbine rotor blade 17. The guide vanes serve also as the support struts 9.

On the outer periphery of the first rotor shaft 14 between one of the supporting members 12 and the hub 16 of the first rotary member 15, a second rotor shaft 20 is mounted mutually rotatably and coaxially with the first rotor shaft 14. The second rotor shaft 20 is a cylindrical shaft and is fitted outlyingly on the first rotor shaft 14, with its one end rotatably supported on a bearing mounted on the supporting member 12 and with the other end also rotatably supported on a bearing mounted on the first rotor shaft 14.

A hub 22 of a second rotary member 21 is rotatably supported on the second rotor shaft 20 in a position adjacent to the axial free end portion of the inside guide assembly 6 where the second rotor shaft 20 is installed therethrough. The hub 22 is of an annular disc member and located within a plane normal to the rotational central axis of the second rotor shaft 2, and is rotatably supported on the second rotor shaft 20 with a center bore thereof. On the hub 22 of the second rotary member 21, a ring gear 23 is fixed coaxially to said rotational central axis. On the second rotor shaft 20 is fixed a sun gear 24; this sun gear 24 and the ring gear 23 constitute an overdrive gearing 25 together with gears each rotatably supported on the supporting member 12. The outer peripheral surface of the hub 22 is formed as an extended curvature of the cylindrical outer peripheral surface 5 of the inside guide assembly 6; a number of spokes or struts 26 with their one end attached to the outer peripheral surface of the hub 22 are attached at the other end thereof to an annular ring member 27, so as to support said annular disc member on the second rotor shaft 20 coaxially to the rotational central axis thereof. The annular ring member 27 has the same inside and outside diameters as the partition wall 7. On the cylindrical outer peripheral surface of the annular ring member 27 are protrusively installed a number of second turbine rotor blades 28, which are radially arranged within the outside path 11. The second turbine rotor blade 28 has an airfoil blade section similar in shape to that of the rotating blade of an impulse turbine such as a Babintiev turbine or a McCormick turbine.

On the end portion of the inside guide assembly 6 on the side of the first rotary member 15, a casing means 31 of a fluid pressurizing-accelerating device 30, for example a housing of an air compressor, is formed or fixed. On the other hand, on the second rotor shaft 20 is fixed a rotor means 32 provided with blades for pressurizing and accelerating the fluid, for example the air, together with the casing means 31. The casing means 31 is open throughout the full circumferential edge portion when the fluid pressurizing-accelerating device 30 is of a centrifugal type, in which the air thus pressurized and accelerated by the rotor means 32 is discharged from the peripheral surface of the rotor means 32 towards the outer peripheral surface of the hub 16 of the first rotary member 15. In the meantime, four collector paths 34 each having a collector port 33 which occupies one fourth of full circumferencial length of the rotor means 32 along the circumferential edge thereof at an intervals of 90 degrees in central angle, is provided, as is clear from FIGS. 2 and 3, in the circumferential side edge portion of the hub 16 of the first rotary assembly 15. Each of the collector paths 34 has a side wall in a form of involute curvature and along the direction of air discharge from the rotor means 32. The air discharged from the rotor means 32 flows into the collector path 34. The collector path 34 is bent so as to divert the air stream to a radial direction within the hub 16 along a smooth curvature. Within said collector path 34, there is provided a guide vane 35 having nearly the same curvature as the curvature of the side wall of the path 34, thereby ensuring smooth air flow.

Figure 3:
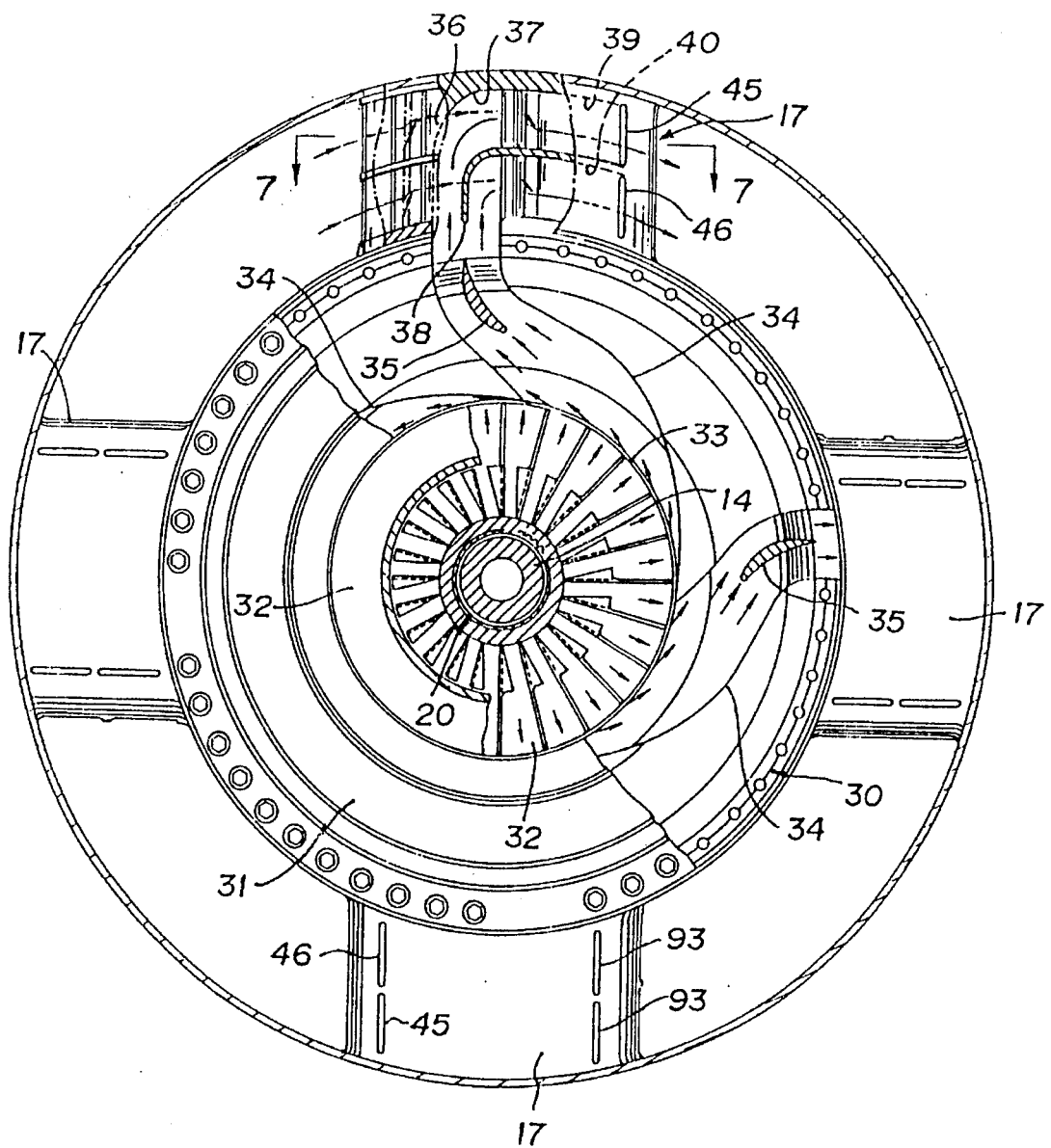
FIG. 3 is a sectional view taken along a line 3—3 of FIG. 2.
Figure 4:
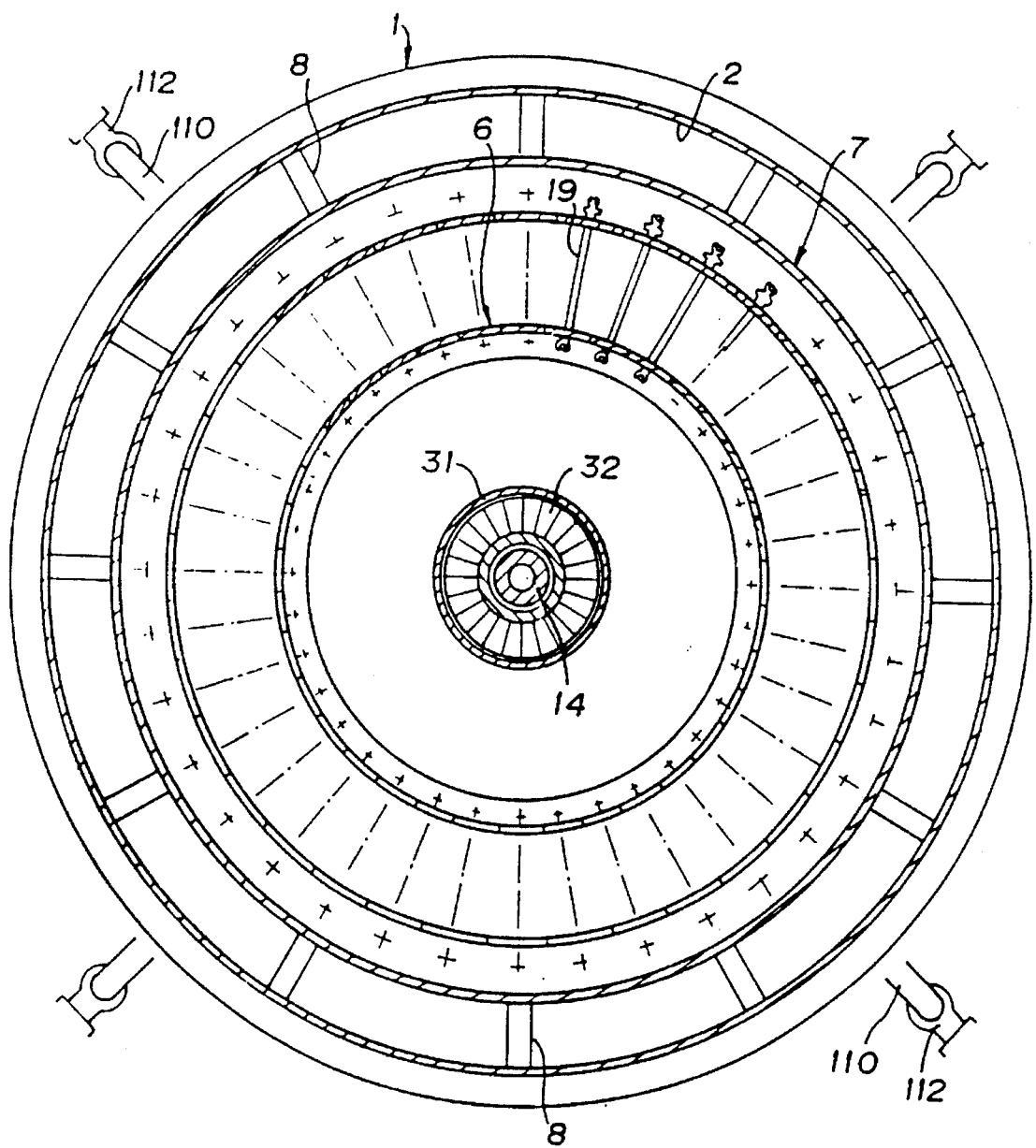
FIG. 4 is a sectional view taken along a line 4—4 of FIG. 2.
Figure 5:
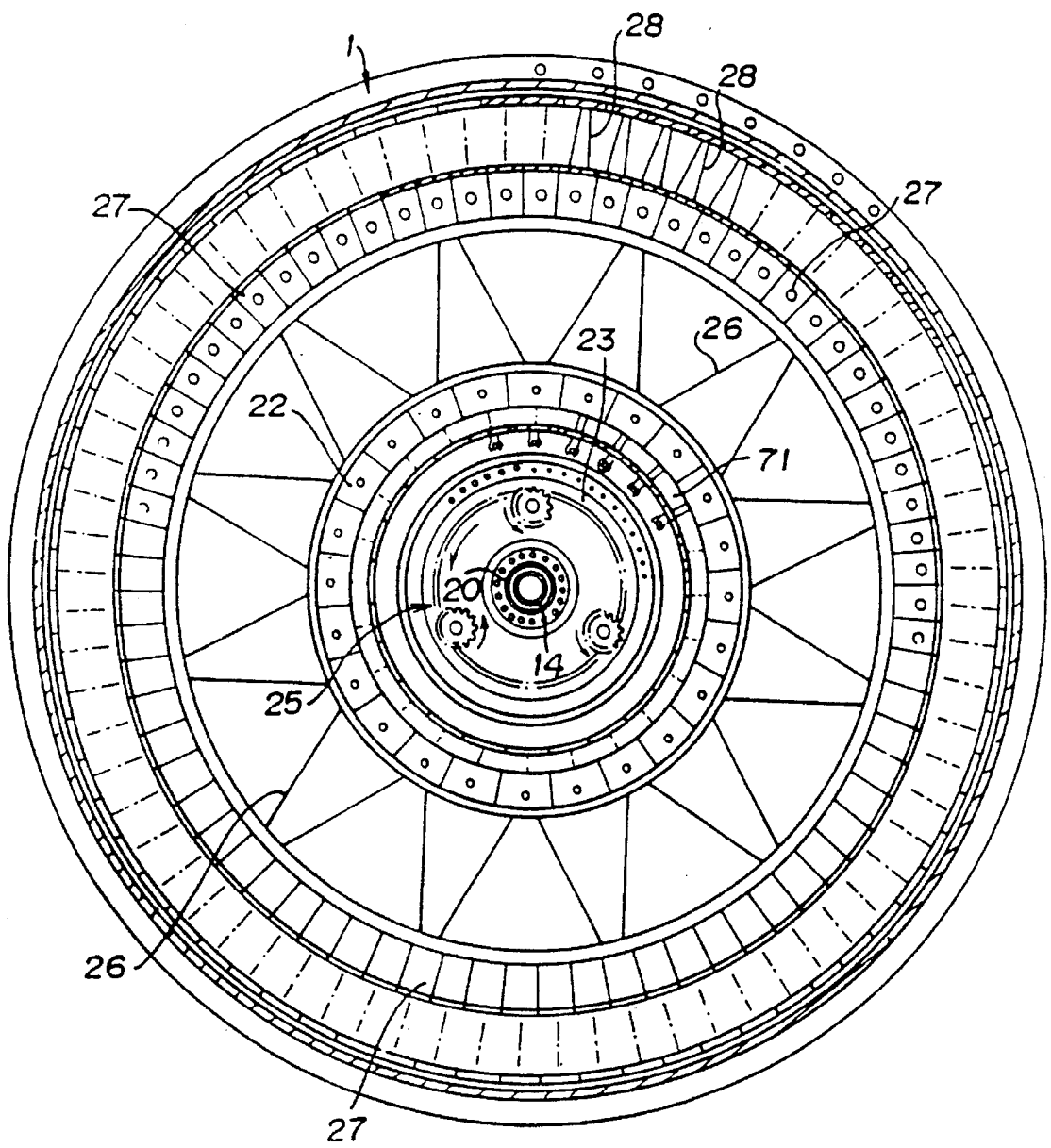
FIG. 5 is a sectional view taken along a line 5—5 of FIG. 2.
Figure 6:
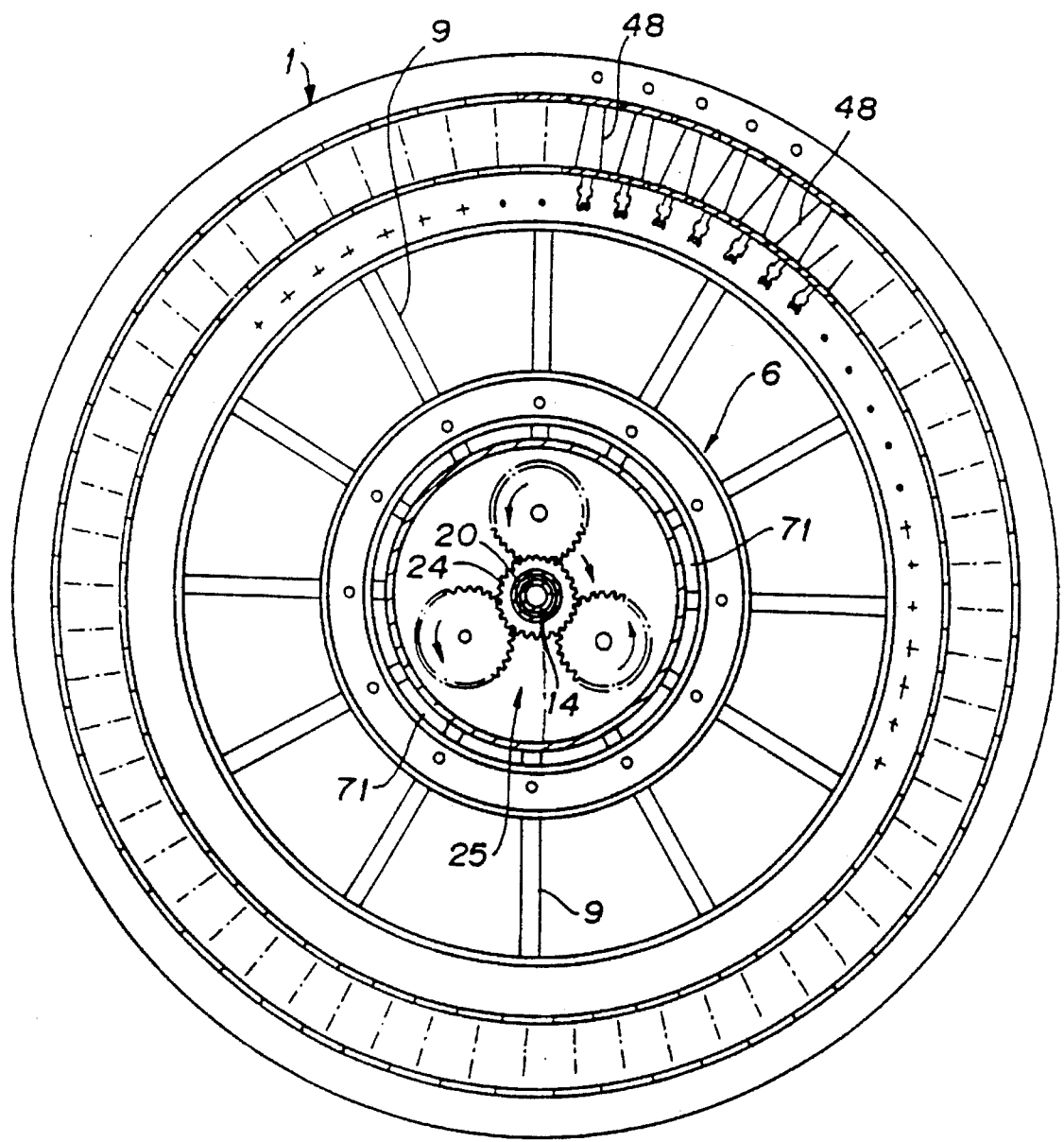
FIG. 6 is a sectional view taken along a line 6—6 of FIG. 3.

In each of the first turbine rotor blades 17, there is provided a fluid exhaust path 36 extending in the radial direction of the hub 16 to communicate with one of the collector paths 34. The fluid exhaust path 36 is provided with an end wall 37 of circular arc shape and a partition wall 38 with a circular arc wall portion at the forward end portion thereof corresponding to the tip end portion of the first turbine rotor blade 17, for diverting the air stream flowing radially therethrough about 90 degrees to the same direction as the direction of diversion of the collector path 34, thereby directing the air stream flowing in the fluid exhaust path 36 towards the trailing edge of the first turbine rotor blade 17. The partition wall 38 also separates the fluid exhaust path 36 into two fluid paths 39 and 40 in the radial direction of the hub 16. The fluid path 39, as shown in FIG. 7, is separated into two branch paths 42 and 43 in the cross sectional view of the blade 17. The branch paths 42 and 43 communicate with rectilineal exhaust nozzles or ports 44 and 45 provided in parallel, along the trailing edge, with both side surfaces of the first turbine rotor blade 17. The other fluid path 40 is also similarly separated into two fluid paths communicating with rectilineal exhaust nozzles provided in parallel with both side surface of the blade 17 along the trailing edge. In FIG. 3, there is shown a nozzle 36 provided on one side.

Figure 9:
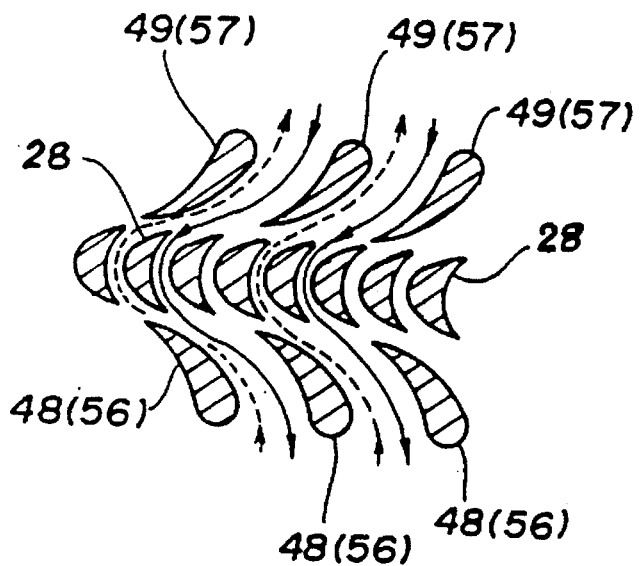
FIG. 9 is a sectional view showing a relation between the second turbine rotor blades and the stator blades or the third turbine rotor blades and the stator blades.

Plurality sets of two stator blades 48 and 49 are protrusively installed in a radial direction within the outside path 11, one end of each set of stator blades 48 and 49 are fixed onto the cylindrical wall inside surface 2 of the outside guide assembly 1 at both sides in the axial direction of the second turbine blade 28 of the second rotary member 21. The other end of the stator blade 48 on one side is connected with a formed partition means 50 which is supported on the outside guide assembly 1 through the supporting member 12 and the support strut 9. The other end of the other stator blade 49 is supported on the partition wall 7. FIG. 1 shows a further other rotary member located adjacently to the second rotary member 21. Where no other rotary member is provided, the stator blades 48 and 49 are located adjacently to both sides of the second turbine rotor blade 28 as shown in FIG. 9. In this case, the stator blades 48 and 49 are inclined in relation to a plane normal to the rotational central axis of the second rotary member 21, and are of an airofoil blade section, respectively, having chord lines in directions in which these chord lines intersect with each other at the outside the blade sections. The second rotary member 21 constitutes said Babintiev impulse turbine having said stator blades 48 and 49 as stationary blades and said second turbine rotor blades 28 as rotating blades.

In the air energy conversion apparatus of the above-described constitution, when an air stream is supplied into the cylindrical wall inside surface 2 of the outside guide assembly 1 and an air stream flowing in the inside path 10 and an air stream flowing in the outside path 11 have been generated, the second rotary member 21 having the second turbine rotor blades 28 locating in the outside path 11 starts rotating even at a low flow velocity at which the first turbine rotor blade 17 having the above-described symmetrical blade section and locating in the inside path 10 is hard to start. The rotational speed of the second rotary member 21 and the hub 22 are made increased by means of the overdrive gearing 25, and is transmitted to the second rotor shaft 20 to rotate the second rotor shaft 20 counterclockwise in FIG. 3. The rotor means 32 of the pressurizing-accelerating device 30, i.e. an air compressor, is rotated in the same direction as the second rotor shaft 20 rotates, then discharging the thus pressurized and accelerated air towards the collector ports 33 formed in the hub 16 of the first rotary member 15. The air that has been discharged to the collector port 33 is exhausted at the exhaust nozzles 44, 45 and 46 open in the blade surface adjacent to the trailing edge of the first turbine rotor blade 17 via the collector path 34, the fluid exhaust path 36, and the fluid paths 39 and 40. The direction of the air stream is changed twice to the same direction by the bent path section of the collector path 34 where the guide vanes 35 are installed, the end wall 37 of the fluid exhaust path 36, and the partition wall 38 having a circular arc wall portion. Thus, the energy of the air stream flowing in the collector path 34 to the fluid exhaust path 36 imparts a counterclockwise rotating force to the first rotary member 15. Therefore when the air energy conversion apparatus is started, the second rotary member 21 is started prior to the starting of the first rotary member 15, giving a rotating force to the first rotary member. And furthermore when the air stream in the outside guide assembly 1 has increased in velocity and pressure, the first rotary member 15 is accelerated by the air stream being exhausted out of the exhaust nozzles 44, 45 and 46.

When the air energy conversion apparatus of the present embodiment is applied to the OWC, the direction of flow of the air stream flowing in the outside guide assembly 1 is reversed alternately. Since the first turbine rotor blade 17 of the first rotary member 15 has a symmetrical blade section having a chord line within a plane normal to the rotational central axis 4 of the rotary member 15, the first rotary member 15 rotates only in one and the same direction even when the direction of flow of the air stream is alternately reversed. In this case, since the second turbine rotor blades 28 of the second rotary member 21 are rotated only in one direction by the stator blades 48 and 49, the direction of rotation of the second rotary member 21 will not change even when the direction of flow of the air stream is reversed.

Next, in the interior of the inside guide assembly 106, a third rotor shaft 51 formed in a cylindrical shaft is coaxially and mutually rotatably supported on the outer peripheral surface of the first rotor shaft 14 similarly to the second rotor shaft 20, and a hub 53 of a third rotary member 52 is rotatably supported in a position adjacent to the free end portion of the inside guide assembly 106. This third rotary member 52 is of the equivalent construction as that of the second rotary member 21. The hub 53 is drivingly coupled with the third rotor shaft 51 through an overdrive gearing 54 to drive the third rotor shaft 51, which, in turn, is driven to rotate in the same direction as the second rotor shaft 20 by third turbine rotor blades 55 protruding into the outside path 11 and stator blades 56 and 57 fixedly protruding into the outside path 11 on axially both sides of the turbine rotor blades 55. The relative configuration of the stator blades 56 and 57 and the third turbine rotor blades 55 are the same as that of the stator blades 48 and 49 and the second turbine rotor blades 28.

At one end portion of the second inside guide assembly 106 on the side of the first rotary member 15 is formed or fixed a casing means 59 of a fluid pressurizing-accelerating device 58, for example the housing of an air compressor; on the third rotor shaft 51 is fixed a rotor means 60 provided with blades for pressurizing and accelerating fluid, for example the air, together with the casing means 59. In an outer peripheral surface of the hub 16 of the first rotary member 15 is formed four collector ports 61 of the same shape as the collector ports 33 for receiving the air discharged from the fluid pressurizing-accelerating device 30 which is driven by the second rotor shaft 20. The air discharged from the pressurizing-accelerating device 58 is supplied into the fluid exhaust path 36 formed in the first turbine rotor blade 17 through the collector ports 61 and a collector path 62.

Since the third rotary member 52 drives to rotate the third rotor shaft 51 in the same direction as the second rotor shaft 20, either one of the second rotary member 21 and the third rotary member 52 which is located on the upstream side can be operated efficiently even when the direction of flow of the air stream is reversed, thereby enabling improving the modulus of efficiency of energy conversion of the first turbine rotor blades 17. Also, since the air stream pressurized and accelerated by the two pressurizing-accelerating device 30 and 58 is fed into the fluid exhaust paths 36 in the first turbine rotor blades 17, the first turbine rotor blades 17 is also increased in the speed of rotation.

Figure 8:
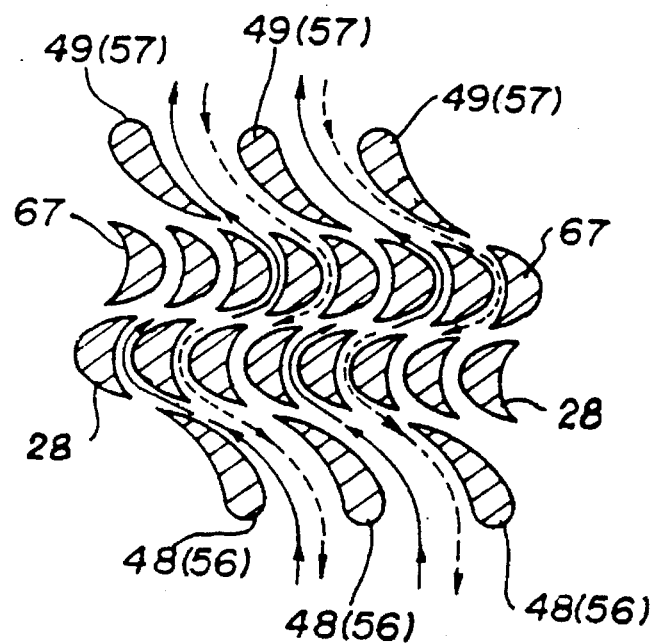
FIG. 8 is a sectional view showing a relation between second turbine rotor blades and fourth turbine rotor blades arranged in two rows and stator blades or third turbine rotor blades and fifth turbine rotor blades arranged in two rows and stator blades.

A forth rotor shaft 63 is mounted coaxially with the first rotor shaft 14 and mutually rotatably supported on the outer periphery of the second rotor shaft 20. This fourth rotor shaft 63 is a cylindrical shaft, and is supported with a bearing on the second rotor shaft 20. On this fourth rotor shaft 63 is rotatably supported a hub 65 of a fourth rotary member 64 in a position adjacent to the second rotary member 21, and is drivingly coupled with the fourth rotor shaft 63 through an overdrive gearing 66 including a gear train supported on the inside guide assembly 6. Since the fourth rotary member 64 is substantially of the same construction as that of the second rotary member 21, the same members as those in the second rotary member 21 will not be explained. Each of fourth turbine rotor blades 67 installed on the fourth rotary member 64 and protruding into the outside path 11 has a blade section of the second turbine rotor blade 28 turned inside out in shape as shown in FIG. 8, and accordingly, the blade section of each of the stator blades 49 located on the Side of the fourth turbine rotor blades 67 has a chord line inclined with respect to a plane normal to the rotational central axis of the second rotor shaft 20 and in parallel with the chord line of the blade section of each of the stator blades 48 located on the side of the second turbine rotor blades 28. The fourth rotary member 64 therefore rotates in the opposite direction as the rotation of the second rotary member 21.

In the inside guide assembly 6 is formed or fixed a casing means 69 of a fluid pressurizing-accelerating device 68, for example the housing of the air compressor. In the meantime, on the fourth rotor shaft 63 is fixedly installed, a rotor means 70 having blades for pressurizing and accelerating the fluid, such as the air, together with the casing means 69. The discharge side of the casing means 59 communicates with the inlet side of the pressurizing-accelerating device 30. The inlet side of the casing means 59, communicates with an outside ambient atmosphere through a stream inlet 71 formed in the hubs 22 and 65 of the second and the fourth rotary members 21 and 64 respectively.

In the second inside guide assembly 106 also, a fifth rotor shaft 75 is mounted coaxially with, and mutually rotatably supported on the third rotor shaft 51; a hub 77 of a fifth rotary member 76 is rotatably supported on the fifth rotor shaft 75, and is drivingly coupled with the fifth rotor shaft 75 through an overdrive gearing 78 including a gear train supported on the inside guide assembly 106.

Since this fifth rotary member 76 is of substantially the same construction as that of the third rotary member 52, the same members as those of the third rotary member 52 will not be explained. Each of fifth turbine rotor blades 79 provided on the fifth rotary member 76 and protruding into the outside path 11 has a reversed shape of blade section of each of the third turbine rotor blades 55, and accordingly the blade section of the stator blade 57 located on the side of the fifth turbine rotor blades 79 has a chord line inclined with respect to a plane normal to the rotational central axis of the third rotor shaft 51 and in parallel with the chord line of the blade section of each of the stator blades 56 located on the side of the third turbine rotor blades 55 (see FIG. 8). The fifth rotary member 76, therefore, rotates in the opposite direction of rotation of the third rotary member 52.

In the second inside guide assembly 106 is formed or fixed a casing means 82 of a fluid pressurizing-accelerating device 81, and further on the fifth rotor shaft 75 is fixed, a rotor means 83 provided with blades for pressurizing and accelerating the fluid together with the casing means 82. The discharge side of the casing means 82 communicates with the inlet side of said pressurizing-accelerating device 58. The inlet side of the casing means 82 communicates with the outside ambient atmosphere through stream inlets formed in the hubs 53 and 77 of the third and the fifth rotary members 52 and 76, respectively, and through a stream inlet defined in the supporting member 12.

The second and the fourth turbine rotor blades 28 and 67 of the second and the fourth rotary members 21 and 64 and the two stator blades 48 and 49 constitute a McCormick impulse turbine, and also the third and the fifth turbine rotor blades 55 and 79 of the third and the fifth rotary members 52 and 76 and two stator blades 56 and 57 constitute a McCormick impulse turbine. Two pressurizing-accelerating devices which are driven by these McCormick impulse turbine are coupled in series with each other, thereby increasing the discharge pressure of the fluid being fed into the fluid exhaust paths 36 of the first turbine rotor blades 17.

Within the section of the first turbine rotor blade 17 shown in FIG. 7, at the leading edge of the first turbine rotor blade 17 are formed an inlet path 91 where a fluid inlet scoop or port 90 is open on its chord line, control fluid inlets 92 and 93 which are open in symmetrical positions in relation to the chord line of the section of the turbine rotor blade 17 on both side surfaces adjacent to the leading edge, and a fluid control chamber 94 communicating with the inlet path 91 and the control fluid inlets 92 and 93. Furthermore, there are formed control paths 95 and 96 extending from the fluid control chamber 94 to the fluid path 39 through both sides of the fluid exhaust path 36. This construction provides a fluid control device 97 which controls the blowing out of the jet air stream either from the exhaust port 44 or the exhaust port 45 through the branch paths 42 or 43 by the difference of the static pressure existed in the control fluid inlets 92 and 93. A fluid control device of the same construction as this fluid control device 97 is installed also in the fluid path 40.

In FIG. 7, suppose that the first turbine rotor blade 17 is rotating at a high speed in the inside path 10, and at the same time the air stream is flowing in the inside path 10 in the direction of the arrow F towards the first turbine rotor blade 17. Since, in this case, a dynamic pressure is acting on the control fluid inlet scoop 90 which opens at the leading edge of the blade 17 in FIG. 7, the air flows into the fluid control chamber 94 from the inlet path 91. In the meantime, since a positive static pressure is applied to the lower surface of the blade 17 while a negative static pressure is applied to the upper surface thereof, the faster the air flows, the larger pressure displacement in the static pressure takes place at the control fluid inlets 92 and 93 which are open in symmetrical positions in relation to a chord line. When the air stream flows in the direction of the arrow F, the control air stream flows from the control fluid inlet port 93 into the fluid control chamber 94, and accordingly adhering the air stream flowing from the inlet path 91 into the fluid control chamber 94 towards the control path 95 side located above. Thus the air stream blowed out from the control path 95 into the fluid path 39 deflects, towards the branch path 43 located below, resulting the air stream exhausted from the fluid exhaust path 36 into the fluid path 39 jetted out only at the exhaust nozzle 45 located below as a jet stream.

The faster the first turbine rotor blades 17 rotate, the higher the second to fifth rotary members increase their speed of rotation, and therefore the air being fed from the pressurizing-accelerating devices which are driven by these rotary members, into the fluid exhaust paths 36 is also being pressurized and accelerated. The air stream is therefore jetted out from the exhaust nozzle 45 in a form of thin film at a high speed under a high pressure. This air stream being jetted out in the form of thin film not only increases, by a reaction of blowing, the speed of rotation of the blades 17 but forms a jet flap for the blades 17 against the air stream flowing in the direction of the arrow. A jet flap effect increases the lift coefficient of the blade 17, thus increasing a lift/drag ratio. Consequently, the prior-art Wales turbine could rotate at a speed of about 3000 rpm; however, the illustrated embodiment described above having the first turbine rotor blades 17 of the same dimensions as the turbine rotor blades of the prior-art Wales turbine, gaining the speed of rotation of 6000 rpm to 9000 rpm.

In FIG. 1, a reference numeral 99 denotes a joint means fixed on one end of the first rotor shaft 14. The joint means 99 is shown in a simplified form in the drawing. Coupling the first rotor shaft 14 to for example the power input shaft of the generator through the joint means 99 can convert the energy of the air stream into an electrical energy.

In the drawing, reference numerals 110 and 111 show pipes which are open in the vicinity of the collector ports 33 and 61 in the hub 16 of the first rotary member 15 with their one end and exposed into the interior space of the first inside guide assembly 6 and the second inside guide assembly 106, and are connected at the other end with each other by a metal fitting 112. The metal fitting 112 is provided with a bleed valve which is designed to operate when a fluid pressure in these pipes 110 and 111 has exceeded a specific value, to bleed off the high-pressure fluid from these pipes 110 and 111. These pipes 110 and 111 serve to send, to one of the collector ports, the air stream pressurized and accelerated by the remarkably increased speed of either one of the pressurizing-accelerating device 30 driven by the second rotor shaft 20 and the pressurizing-accelerating device 58 driven by the third rotor shaft 51 when the air stream thus pressurized and accelerated has leaked from the other of the collector ports 33 and 61 of the first rotor assembly 15.

A preferable symmetrical blade section of the first turbine rotor blade 17 is a laminar flow airofoil section having a great lift/drag ratio, for example NACA64A010, one of NACA64, NACA65, and NACA67 series at designation of NACA section.

PROBABILITY OF INDUSTRIAL UTILIZATION

According to the present invention, a so-called Wales turbine is constituted with a fluid path assembly, a first rotor shaft rotatably supported in the fluid path assembly and a first rotary member having first turbine rotor blades fixed on the first rotor shaft, each of the first turbine rotor blades has a chord line within a plane normal to the first rotor shaft and has a symmetrical blade section having a line symmetry in relation to the chord line. The fluid path assembly comprises an outside guide assembly, a cylindrical partition wall and an inside guide assembly for forming an annular outside path between the outside guide assembly and the cylindrical partition wall and an annular inside path between the cylindrical partition wall and the inside guide assembly. The first turbine rotor blades are protrusively positioned within the inside path. It is, therefore, possible to convert the energy of a fluid flowing in the inside path into an rotational energy of the first rotor shaft, from which the rotational energy can be taken out.

Furthermore, one or a plurality of rotor shafts are mutually rotatably arranged coaxially with the first rotor shaft. At least one rotary member, namely a second rotary member, having second turbine rotor blades protruding into the outside path is drivingly coupled with one of said rotor shaft, namely a second rotor shaft, through an overdrive gearing for driving a rotor means of a fluid pressurizing-accelerating device. The fluid pressurized and accelerated by the fluid pressurizing-accelerating device is fed from collector ports formed in the first rotary member into a fluid exhaust path having a circular arc wall in each of the first turbine rotor blades, and is blown out at exhaust nozzles which are open in both sides of a position adjacent to the trailing edge of the first turbine rotor blades, thereby improving the self-stating characteristic and speed of revolution of the first turbine rotor blades.

Within the high-speed range of the first turbine rotor blade, the high-speed, high-pressure fluid fed into the fluid exhaust path is jetted out only from the exhaust nozzle open in the side face of the high-pressure side of the first turbine rotor blade by means of a fluid control device constituted therein to thereby further increasing the speed of revolution of the first turbine rotor blade and improve the modulus of energy conversion of the first turbine rotor blade.

The turbine provided with the first turbine rotor blades having the symmetrical blade section is known to be a turbine constantly rotates the turbine rotor shaft unidirectionally even when the direction of flow of the fluid has been reversed. The fluid energy conversion apparatus in accordance with the present invention, therefore, is specially preferable for use in an equipment, such as the OWC which converts a height change of waves into an air stream which alternately changes the direction of flow of the air from a normal direction to a reverse direction and vice versa, thereby driving the generator with the turbine rotor shaft rotated by the air stream.

I claim:

1. A fluid energy conversion apparatus, comprising:

a fluid path assembly including an outside guide assembly provided with a cylindrical wall inside surface at a principal portion of an inside wall thereof; at least one inside guide assembly having an outside surface formed in a shape of rotation symmetry arranged symmetrically on the central axis of said cylindrical wall inside surface; a cylindrical partition wall which extends between said outside guide assembly and said inside guide assembly, with its central axis set on the central axis of said cylindrical wall inside surface, said cylindrical wall inside surface of said outside guide assembly and said cylindrical partition wall defining an annular outside path therebetween, the outside peripheral surface of said inside guide assembly and said cylindrical partition wall defining an annular inside path therebetween; and a plurality of support struts connecting said outside guide assembly, said inside guide assembly and said cylindrical partition wall;

a first rotor shaft having a rotational central axis on the central axis of said cylindrical wall inside surface of said outside guide assembly, and rotatably supported on said fluid path assembly;

a second rotor shaft arranged coaxially with and rotatably on said the first rotor shaft;

a first rotary member having a first annular hub located adjacent a first end portion of said inside guide assembly in the axial direction thereof and coaxially fixed on said first rotor shaft, and a plurality of first turbine rotor blades fixed on said first annular hub and radially protruding in said annular inside path;

a second rotary member having a second annular hub located adjacent a second end portion of said inside guide assembly in the axial direction thereof, supported coaxially with and rotatably on said second rotor shaft and drivingly coupled with said second rotor shaft through an overdrive gearing; a first annular ring member having substantially the same radius as that of said cylindrical partition wall and supported on said second annular hub coaxially with said second rotor shaft by a plurality of support struts protruding into said annular inside path; a plurality of second turbine rotor blades each fixed on an outside surface of said first annular ring member and protruding radially into said annular outside path;

first stator blades including a first row of a plurality of stator blades and a second row of a plurality of stator blades, each stator blade in said first row having a corresponding stator blade in said second row, each of said corresponding stator blades forming a pair of stator blades, each of said stator blades being fixed at one end thereof on said cylindrical wall inside surface of said outside guide assembly, with each pair of stator blades radially protruding into said outside path at both sides of said second turbine rotor blades in the direction of the central axis of said cylindrical wall inside surface at a substantially equal spacing in a circumferential direction of said cylindrical wall inside surface; and a fluid pressurizing-accelerating device including a casing means fixed on said inside guide assembly at the inside thereof and having a discharge port directed towards said first annular hub of said first rotary member, a rotor means located inside of said casing means and fixedly mounted on said second rotor shaft;

said first annular hub of said first rotary member having in an outer peripheral edge portion on one side thereof a collector port for receiving a fluid from said discharge port of said fluid pressurizing-accelerating device; each of said first turbine rotor blades having a symmetrical airofoil blade section having a chord line existing in a plane normal to said first rotor shaft and a fluid exhaust path which is communicated at one end thereof with said collector port of said first annular hub and also communicates at the other end thereof with an exhaust nozzle formed in both sides of each of said first turbine rotor blades in a position adjacent to a trailing edge of each of said first turbine rotor blades; and said first row of stator blades and said second row of stator blades each being positioned in a row extending in the circumferential direction of said cylindrical wall inside surface, one of said first row of stator blades and one of said second row of stator blades being a pair and positioned on opposed sides of said second turbine rotor blades formed in an airofoil section; each of said first and second rows of stator blades having a chord line inclined in relation to a plane normal to the rotational central axis of said second rotary member, the chord lines of said first and second rows of stator blades being intersected with each other at the outside of the blade sections, whereby said second rotary member being rotated only in a single direction by means of said second turbine rotor blades and said first stator blades.

2. A fluid energy conversion apparatus as claimed in claim 1, wherein each of said first turbine rotor blades being provided with a fluid control device having a fluid inlet port which is open in a leading edge of said first turbine rotor blade and on the chord line thereof, a pair of control fluid inlets which are open in the side walls of said first turbine rotor blade nearby said leading edge thereof in symmetrical positions in relation to said chord line, a fluid control chamber which communicates with said fluid inlet port and control fluid inlets, and a pair of control paths which communicate at their respective first end with said fluid control chamber at at least substantially symmetrically spaced positions in relation to said chord line and also communicate at their respective other ends with openings formed at symmetrically spaced positions in relation to said chord line in a wall of a fluid path connecting said fluid exhaust path and a pair of branch paths communicating with said exhaust nozzles formed in both side surfaces of said first turbine rotor blade, each of said exhaust nozzles provided in one of said first turbine rotor blades having an at least substantially rectangular opening with one side thereof at least substantially in parallel with the trailing edge of said first turbine rotor blade.

3. The fluid energy conversion apparatus as claimed in claims 1 or 2, further comprising: a fourth rotor shaft supported coaxially with and rotatably on the outer periphery of said second rotor shaft; a fourth rotary member including a fourth annular hub supported coaxially with and rotatably on said fourth rotor shaft at a position adjacent said second annular hub of said second rotary member in the axial direction thereof, an overdrive gearing, said fourth rotary member being drivingly coupled with said fourth rotor shaft through said overdrive gearing, a third annular ring member having substantially the same radius as that of said cylindrical partition wall and supported on said forth annular hub of said fourth rotary member coaxially with said fourth rotor shaft by a plurality of support struts protruding into said annular inside path, and a plurality of fourth turbine rotor blades each fixed on an outside surface of said third annular ring member and radially protruding into said annular outside path between said second turbine rotor blades of said second rotary member and one row of said first and second rows of stator blades constituting said first stator blades and arranged on both axial sides of said second turbine rotor blades; a third fluid pressurizing-accelerating device including a rotor means fixed on said fourth rotor shaft and further including a casing means having a discharge port connected to an inlet port of said first fluid pressurizing-accelerating device fixed in said first inside guide assembly; each stator blade of said first stator blades having an airofoil section with a chord line thereof inclined in relation to a plane normal to the rotational central axis of said second rotary member and said chord lines of all stator blades of said first stator blades are at least substantially parallel with each other, whereby said fourth rotary member can be rotated only in the opposite direction in relation to said second rotary member.

4. A fluid energy conversion apparatus as claimed in claim 1, wherein said fluid path assembly is provided with a second inside guide assembly having a similar shape as said first mentioned inside guide assembly on the other side in the axial direction of said first rotor assembly and fixed coaxially with the cylindrical wall inside surface of said fluid guide assembly with one end portion of said second inside guide assembly positioned against the other side face of said first annular hub of said first rotary member; a third rotary member comprising a third rotor shaft disposed coaxially with and rotatably on said first rotor shaft, a third annular hub located at an adjacent position to the other end portion of said second inside guide assembly supported coaxially with and rotatably on said third rotor shaft; an overdrive gearing, said third annular hub drivingly coupled with said third rotor shaft through said overdrive gearing, a second annular ring member having substantially the same radius as that of said cylindrical partition wall and supported on said third annular hub of said third rotary member coaxially with said third rotor shaft by a plurality of support struts, said support struts protruding into an annular inside path formed between said second inside guide assembly and said cylindrical partition wall; a plurality of third turbine rotor blades fixedly installed on the outer periphery of said second annular ring member and radially protruding in said annular outside path; second stator blades including a third row of a plurality of stator blades and a fourth row of a plurality of stator blades, each stator blade in said third row having a corresponding stator blade in said fourth row, each of said corresponding stator blades forminq a pair of stator blades, each of said stator blades being fixed at one end thereof on said cylindrical wall inside surface of said outside guide assembly, with each pair of stator blades radially protruding into said annular outside path at both sides of said third turbine rotor blades in the direction of the central axis of said cylindrical wall inside surface of said outside guide assembly and arranged at at least substantially equal spacing in the circumferential direction of said cylindrical wall inside surface; a second fluid pressurizing-accelerating device including a casing means fixed to and within the interior of said second inside guide assembly and having a discharge port open in a direction of one side surface of said first annular hub of said first rotary member; a rotor means located in the interior of said casing means and fixed on said third rotor shaft; said first annular hub of said first rotary member having in the outer peripheral portion on said one side thereof a second collector port which receives the fluid from said discharge port of said second fluid pressurizing-accelerating device and joined to said collector port formed on the other side of said first annular hub; said third row of stator blades and said fourth row of stator blades being positioned in a row extending in the circumferential direction of said cylindrical wall inside surface, one of said third row of stator blades and one of said fourth row of stator blades being a pair and positioned on opposed sides of said third turbine rotor blades formed in an airofoil section; each of said third and fourth rows of stator blades having a chord line inclined in relation to a plane normal to the rotational central axis of said third rotary member and chord lines of said third and fourth rows of stator blades intersected with each other at the outside of the blade sections, whereby said third rotary member is rotated only in a single direction by means of said third turbine rotor blades and said second stator blades.

5. The fluid energy conversion apparatus as claimed in claim 4, wherein each of said first turbine rotor blades being provided with a fluid control device having a fluid inlet port which is open in a leading edge of said first turbine rotor blade and on the chord line thereof, a pair of control fluid inlets which are open in the side walls of said first turbine rotor blade nearby said leading edge thereof in symmetrical positions in relation to said chord line, a fluid control chamber which communicates with said fluid inlet port and control fluid inlets; a pair of control paths which communicate at their respective first end with said fluid control chamber at at least substantially symmetrically spaced positions in relation to said chord line and also communicate at their respective second ends with openings formed at at least substantially symmetrically spaced positions in relation to said chord line in a wall of a fluid path connecting said fluid exhaust path and a pair of branch paths communicating with said exhaust nozzles formed in both side surfaces of said first turbine rotor blade, each of said exhaust nozzles provided in one of said first turbine rotor blades having an at least substantially rectangular opening with one side thereof at least substantially in parallel with the trailing edge of said first turbine rotor blades.

6. The fluid energy conversion apparatus as claimed in claims 4 or 5, further comprising: a fourth rotor shaft supported coaxially with and rotatably on the outer periphery of said second rotor shaft; a fourth rotary member including a fourth annular hub supported coaxially with and rotatable on said fourth rotor shaft at a position adjacent said hub of said second rotary member in the axial direction thereof; an overdrive gearing, said fourth rotary member drivingly coupled with said fourth rotor shaft through said overdrive gearing, a third annular ring member having substantially the same radius as that of said cylindrical partition wall and supported on said fourth annular hub of said fourth rotary member coaxially with said fourth rotor shaft by a plurality of support struts protruding into said annular inside path; a plurality of fourth turbine rotor blades each fixed on an outside surface of said third annular ring member and radially protruding into said annular outside path between said second turbine rotor blades of said second rotary member and one row of said first and second rows of stator blades constituting said first stator blades and arranged on both axial sides of said second and fourth turbine rotor blades; a third fluid pressurizing-accelerating device including a rotor means fixed on said fourth rotor shaft and further including a casing means having a discharge port connected to an inlet port of said first fluid pressurizing-accelerating device fixed in said first inside guide assembly; each stator blade of said first stator blades having an airofoil section with a chord line thereof inclined in relation to a plane normal to the rotational central axis of said second rotary member and said chord lines of all stator blades of said first stator blades are at least essentially parallel with each other, whereby said fourth rotary member can be rotated only in the opposite direction in relation to said second rotary member; and further comprising: a fifth rotor shaft supported coaxially with and rotatably on the outer periphery of said third rotor shaft; a fifth rotary member including a fifth annular hub supported coaxially with and rotatably on said fifth rotor shaft at a position adjacent said third annular hub of said third rotary member in the axial direction thereof; an overdrive gearing, said fifth rotary member being drivingly coupled with said fifth rotor shaft through said overdrive gearing, a fourth annular ring member having at least substantially the same radius as that of said cylindrical partition wall and supported on said fifth annular hub of said fifth rotary member coaxially with said fifth rotor shaft by a plurality of support struts protruding into said annular inside path; a plurality of fifth turbine rotor blades each fixed on an outside surface of said fourth annular ring member and radially protruding into said annular outside path between said third turbine rotor blades of said third rotary member and one row of said third and fourth rows of stator blades constituting said second stator blades and arranged on both axial sides of said third turbine rotor blades; a fourth fluid pressurizing-accelerating device including a rotor means fixed on said fifth rotor shaft and further including a casing means having a discharge port connected to an inlet port of said second fluid pressurizing-accelerating device in said second inside guide assembly; each stator blade of said second stator blades having an airofoil section with a chord line inclined in relation to a plane normal to the rotational central axis of said third rotary member and said chord lines of all stator blades of said second stator blades are at least essentially parallel with each other, whereby said fifth rotary member can be rotated only in the opposite direction in relation to said third rotary member.

\* \* \* \* \*